(12) United States Patent
Liu

(10) Patent No.: US 9,993,926 B2
(45) Date of Patent: Jun. 12, 2018

(54) JOINT STRUCTURE

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventor: Te-Wei Liu, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 581 days.

(21) Appl. No.: 14/806,813

(22) Filed: Jul. 23, 2015

(65) Prior Publication Data
US 2016/0348703 A1 Dec. 1, 2016

(30) Foreign Application Priority Data

Jun. 1, 2015 (CN) .......................... 2015 1 0292868

(51) Int. Cl.
*A63H 3/46* (2006.01)
*B25J 17/00* (2006.01)
*A63H 13/00* (2006.01)

(52) U.S. Cl.
CPC ................ *B25J 17/00* (2013.01); *A63H 3/46* (2013.01); *A63H 13/00* (2013.01)

(58) Field of Classification Search
CPC .. H05K 5/00; H05K 5/02; H05K 5/04; H05K 5/06; H05K 5/08; H05K 5/22; H05K 5/225; H05K 5/24; H05K 5/161; A63H 3/46

See application file for complete search history.

(56) References Cited

U.S. PATENT DOCUMENTS 4,883,997 A * 11/1989 De Cesare ............. H02K 1/143
 310/179
4,942,323 A * 7/1990 DeCesare ............. H02K 1/143
 310/172

(Continued)

FOREIGN PATENT DOCUMENTS

CN 101804637 A 8/2010
CN 104260106 A 1/2015

(Continued)

OTHER PUBLICATIONS

CN 1st OA dated Mar. 6, 2018 of the corresponding China patent application No. 201510292868.8.

*Primary Examiner* — Daniel J Wiley
(74) *Attorney, Agent, or Firm* — Chun-Ming Shih; HDLS IPR Services

(57) ABSTRACT

A joint structure includes a joint hollow body having a first plate and a second plate arranged opposite to each other, and the second plate has a penetrating hole for defining an axial direction with respect to the penetrating hole, and an external side plate is extended in the defined axial direction from the external periphery of the first plate and connected to the external periphery of the second plate, so as to enhance the structural strength of the joint hollow body and prevent the joint hollow body from having concentrated stress or being cracked easily.

24 Claims, 17 Drawing Sheets

(56) References Cited

U.S. PATENT DOCUMENTS

| | | | | | |
|---|---|---|---|---|---|
| 4,963,777 | A | * | 10/1990 | Blum | H02K 17/30 |
| | | | | | 310/68 A |
| 5,006,744 | A | * | 4/1991 | Archer | H02K 29/06 |
| | | | | | 310/58 |
| 5,245,237 | A | * | 9/1993 | Fisher | H02K 5/225 |
| | | | | | 310/89 |
| 5,357,161 | A | * | 10/1994 | Daniels | H02K 5/04 |
| | | | | | 174/50 |
| 5,977,671 | A | * | 11/1999 | Kim | H02K 29/08 |
| | | | | | 310/101 |
| 7,109,621 | B2 | * | 9/2006 | Lesak | H02K 5/1672 |
| | | | | | 310/216.023 |
| 8,227,947 | B2 | * | 7/2012 | Oleson | F04D 13/06 |
| | | | | | 310/88 |
| 8,896,169 | B2 | * | 11/2014 | Song | H02K 5/20 |
| | | | | | 310/68 R |
| 9,071,183 | B2 | * | 6/2015 | Becerra | H02P 5/74 |
| 9,209,666 | B2 | * | 12/2015 | Wang | H02K 5/15 |
| 2005/0093381 | A1 | * | 5/2005 | Ionel | H02K 1/143 |
| | | | | | 310/49.01 |

FOREIGN PATENT DOCUMENTS

| | | |
|---|---|---|
| CN | 104385294 A | 3/2015 |
| CN | 104647397 A | 5/2015 |
| JP | 3180833 U | 1/2013 |

* cited by examiner

000# JOINT STRUCTURE

FIELD OF THE INVENTION

The technical field relates to a joint of a robot or a toy, more particularly to a joint structure.

BACKGROUND OF THE INVENTION

3D Printing is a quick formation technology that uses an adhesive material such as powder metal or plastic to construct an object by stacking and accumulating the adhesive material layer by layer, and such technology is also known as "additive manufacturing". At present, the 3D printing rapid manufacturing is generally used for manufacturing toys, mechanical components or human bone parts, and 3D printing gradually becomes a popular technology.

In a machine such as a toy or robot that requires mutually rotating joints to achieve a rotational movement, a motor or bearing is generally pivoted to a C-shaped or U-shaped block, so that the motor or bearing can rotate the C-shaped or U-shaped block to produce a rotational movement at the pivoting position of the motor or bearing and the C-shaped or U-shaped block of the toy or robot.

However, if the C-shaped or U-shaped block is manufactured by the 3D printing technology, the stacked structure manufactured by the additive manufacturing process has the issues of insufficient structural strength and easy cracking of the C-shaped or U-shaped block. If the motor or bearing applies a force to the C-shaped or U-shaped block, stress may be concentrated at the C-shaped or U-shaped block to crack the C-shaped or U-shaped block.

In view of the aforementioned problems of the prior art, the inventor of this disclosure based on years of experience in the industry to conduct extensive researches and experiments and finally invented a joint structure to overcome the problems of the prior art.

SUMMARY OF THE INVENTION

Therefore, it is a primary objective of this disclosure to provide a joint structure that uses a joint hollow body having an external side plate extended in the axial direction from the external periphery of a first plate and a second plate separately, and the external side plates are connected to each other to enhance the structural strength of the joint hollow body and prevent the joint hollow body from having concentrated stress or cracking easily.

In an exemplary embodiment of this disclosure, the joint structure comprises: a joint hollow body, having a first plate and a second plate disposed opposite to each other, and the second plate having a penetrating hole and defining an axial direction with respect to the penetrating hole, wherein an external side plate is extended in the axial direction from the external periphery of the first plate, and connected to the external periphery of the second plate.

The joint structure of this disclosure further has the following effects:

1. The joint structure of this disclosure further includes a rotating member installed in the joint hollow body. Since the rotating member may apply a force to the external side plate near the penetrating hole, therefore the external side plate being a substantially circular plate near the penetrating hole and having the advantages of uniform force exertion and non-concentrated stress enhances the structural strength of the joint hollow body.

2. The joint hollow body includes a first casing and a second casing engaged with each other, and the first casing includes a first plate and a first external side plate extended from the external periphery of the first plate, and the second casing includes a second plate and a second external side plate extended from the external periphery of the second plate, and the second casing is covered onto the first casing correspondingly, and the second external side plate and the first external side plate are fixed to each other to form the external side plate, so as to provide a convenient way of installing the rotating member into the joint hollow body.

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

With reference to FIGS. 1 to 13 for the first embodiment of a joint structure of this disclosure, the joint structure 10 comprises a joint hollow body 1.

Figure 1:
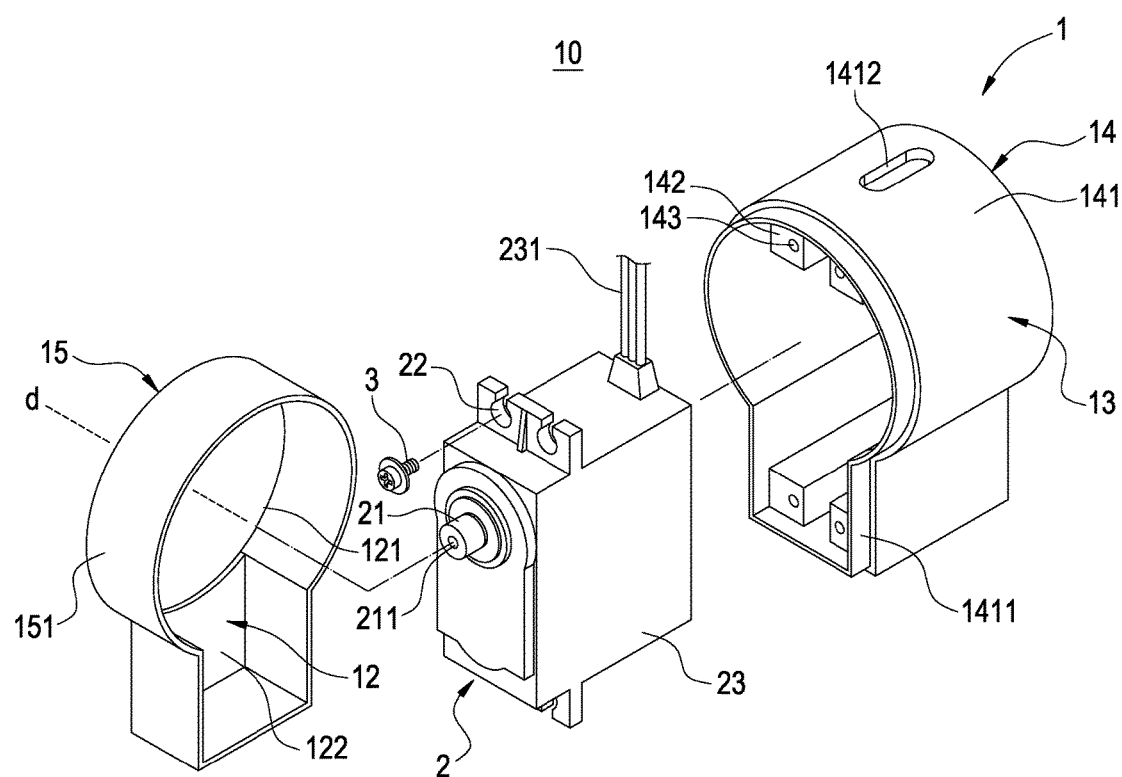
FIG. 1 is an exploded view of a first embodiment of a joint structure of this disclosure.
Figure 2:
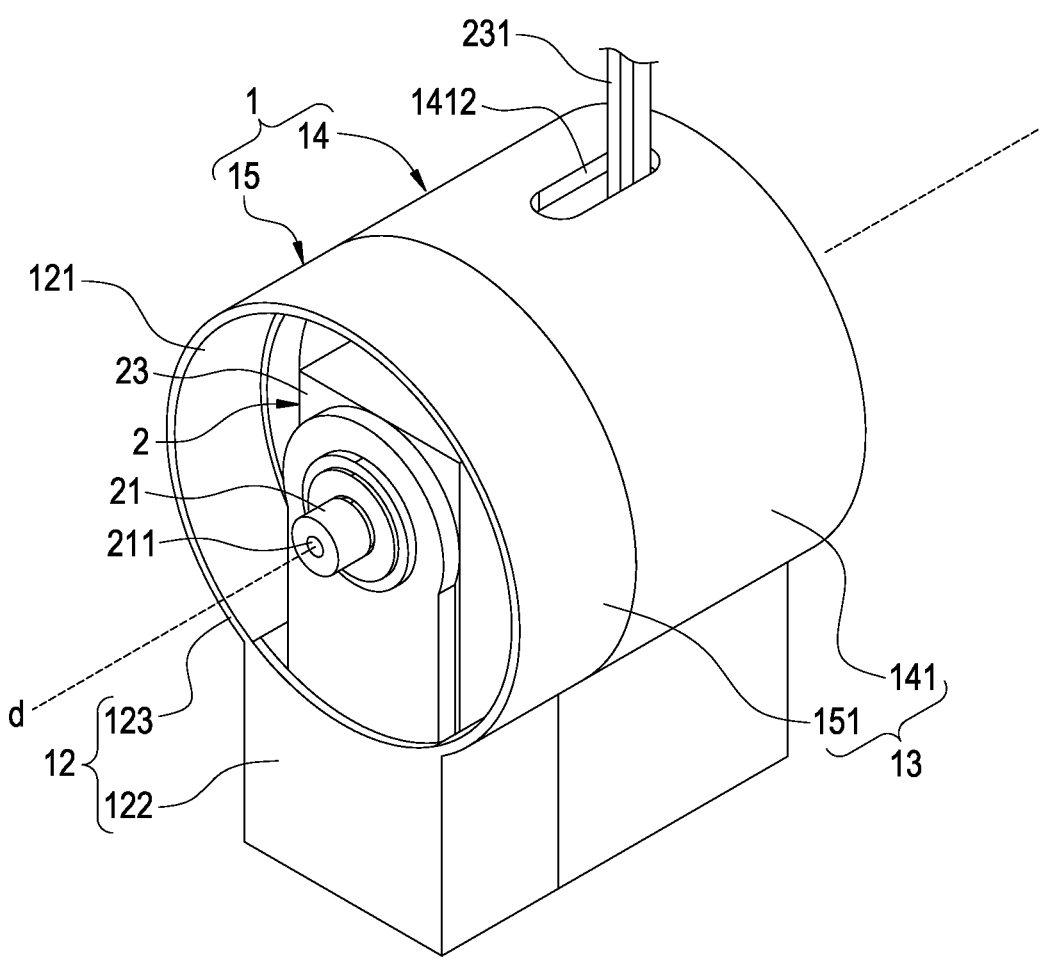
FIG. 2 is a perspective view of the first embodiment of a joint structure of this disclosure.
Figure 3:
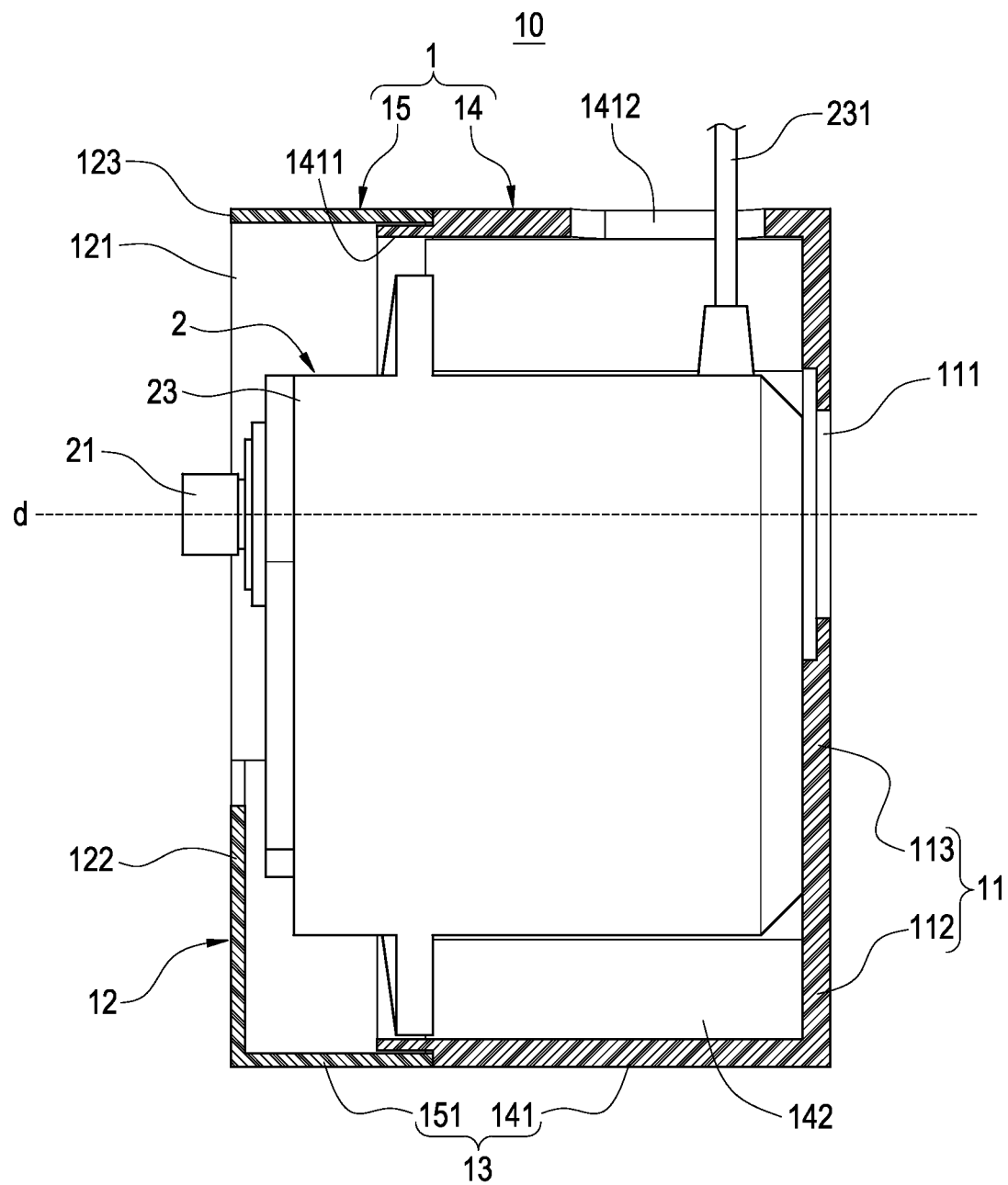
FIG. 3 is a cross-sectional view of the first embodiment of a joint structure of this disclosure.

In a first embodiment of a joint structure 10 of this disclosure as shown in FIGS. 1 to 3, the joint hollow body 1 comprises a first plate 11 and a second plate 12 arranged opposite to each other, and the second plate 12 has a penetrating hole 121 and defines an axial direction d with respect to the penetrating hole 121, and the first plate 11 has an air hole 111 configured to be opposite to the penetrating hole 121, and an external side plate 13 is extended in the defined axial direction d from the external periphery of the first plate 11 and the second plate 12. Wherein, the external side plate 13 is a substantially circular plate.

Specifically, the joint hollow body 1 comprises a first casing 14 and a second casing 15 engaged with each other, and the first casing 14 includes a first plate 11 and a first external side plate 141 extended from the external periphery of the first plate 11, and the second casing 15 includes a second plate 12 and a second external side plate 151 extended from the external periphery of the second plate 12, and the second casing 15 is covered correspondingly onto the first casing 14, and the second external side plate 151 and the first external side plate 141 are connected to each other to form the external side plate 13. Wherein, the joint hollow body 1 is manufactured by a 3D printing technology. In other words, the first casing 14 and the second casing 15 are manufactured separately by the 3D printing technology.

In addition, a plurality of fixing columns 142 is extended jointly from the first plate 11 and the first external side plate 141, and each fixing column 142 has a first fixing hole 143, and a protruding member 1411 is extended from the first external side plate 141, and the second external side plate 151 is installed to the protruding member 1411 and latched with the protruding member 1411.

In addition, the first plate 11 includes a first rectangular plate 112 and a first circular plate 113 extended from the top of the first rectangular plate 112, and the second plate 12 includes a second rectangular plate 122 and a second circular plate 123 extended from the top of the second rectangular plate 122, and an air hole 111 is formed on the first circular plate 113, and a penetrating hole 121 is formed on the second circular plate 123.

The joint structure 10 of this disclosure further comprises a rotating member 2 having a rotating shaft 21 and a plurality of second fixing holes 22, and the rotating member 2 is installed in the joint hollow body 1, and the rotating shaft 21 is exposed and protruded from the penetrating hole 121, and the rotating shaft 21 has a first through hole 211. Wherein, the rotating member 2 of this embodiment is a motor 23, and the motor 23 includes an electric wire 231, and the first external side plate 141 has a wire passing hole 1412 for passing the electric wire 231.

The joint structure 10 of this disclosure further comprises a plurality of screws 3, and each screw 3 is passed through and fixed to each respective second fixing hole 22 and each respective first fixing hole 143, so that the motor 23 is fixed into the first casing 14.

In the assembly of the joint structure 10 of this disclosure, the joint hollow body 1 comprises a first plate 11 and a second plate 12 arranged opposite to each other, and the second plate 12 has a penetrating hole 121 and defines an axial direction d with respect to the penetrating hole 121, and an external side plate 13 is extended from the axial direction d from the external periphery of the first plate 11 and the second plate 12. Since the joint hollow body 1 manufactured by the 3D printing technology has the issues of insufficient structural strength and easy cracking, therefore the joint hollow body 1 has the external side plate 13 extended in the axial direction d, and both ends of the external side plate 13 are connected to the external periphery of the first plate 11 and the external periphery of the second plate 12 respectively, and the external side plate 13 is capable of enhancing the structural strength of the joint hollow body 1, so that the joint hollow body 1 has the features of non-concentrated stress and high cracking resistance.

In addition, the first plate 11 includes a first circular plate 113, and the second plate 12 includes a second circular plate 123, so that the external side plate 13 near the penetrating hole 121 becomes a substantially circular plate, and the rotating member 2 has a rotating shaft 21 exposed and protruded from the penetrating hole 121, so that the rotating member 2 may apply a force to the external side plate 13 near the penetrating hole 121 easily. Since the external side plate 13 near the penetrating hole 121 is a substantially circular plate and the shape and structure of the circular plate has the feature of uniform force exertion and non-concentrated stress, therefore the structural strength of the joint hollow body 1 is further enhanced.

Further, the joint hollow body 1 comprises a first casing 14 and a second casing 15 engaged with each other, and the first casing 14 includes a first plate 11 and a first external side plate 141 extended from the external periphery of the first plate 11, and the second casing 15 includes a second plate 12 and a second external side plate 151 extended from the external periphery of the second plate 12, and the second casing 15 is covered correspondingly onto the first casing 14, and the second external side plate 151 and the first external side plate 141 are connected to each other to form the external side plate 13, so as to provide a convenient way of installing the rotating member 2 into the joint hollow body 1.

Figure 4:
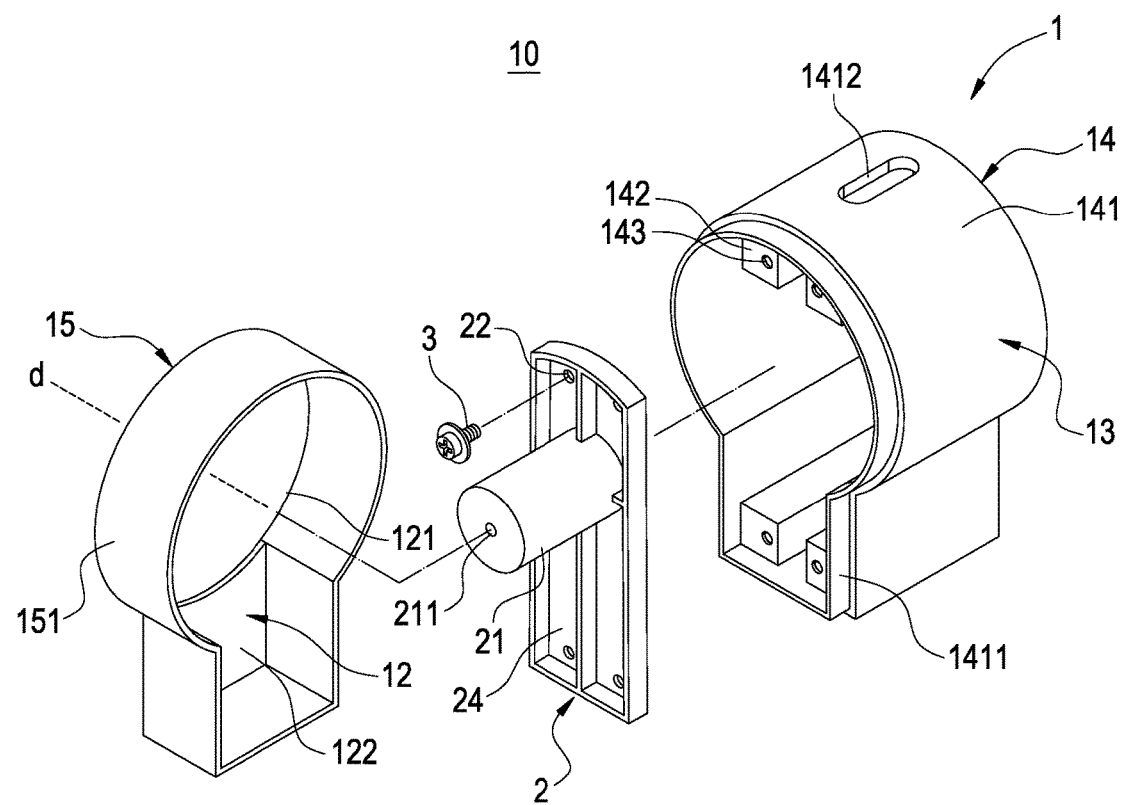
FIG. 4 is an exploded view of a second embodiment of a joint structure of this disclosure.
Figure 5:
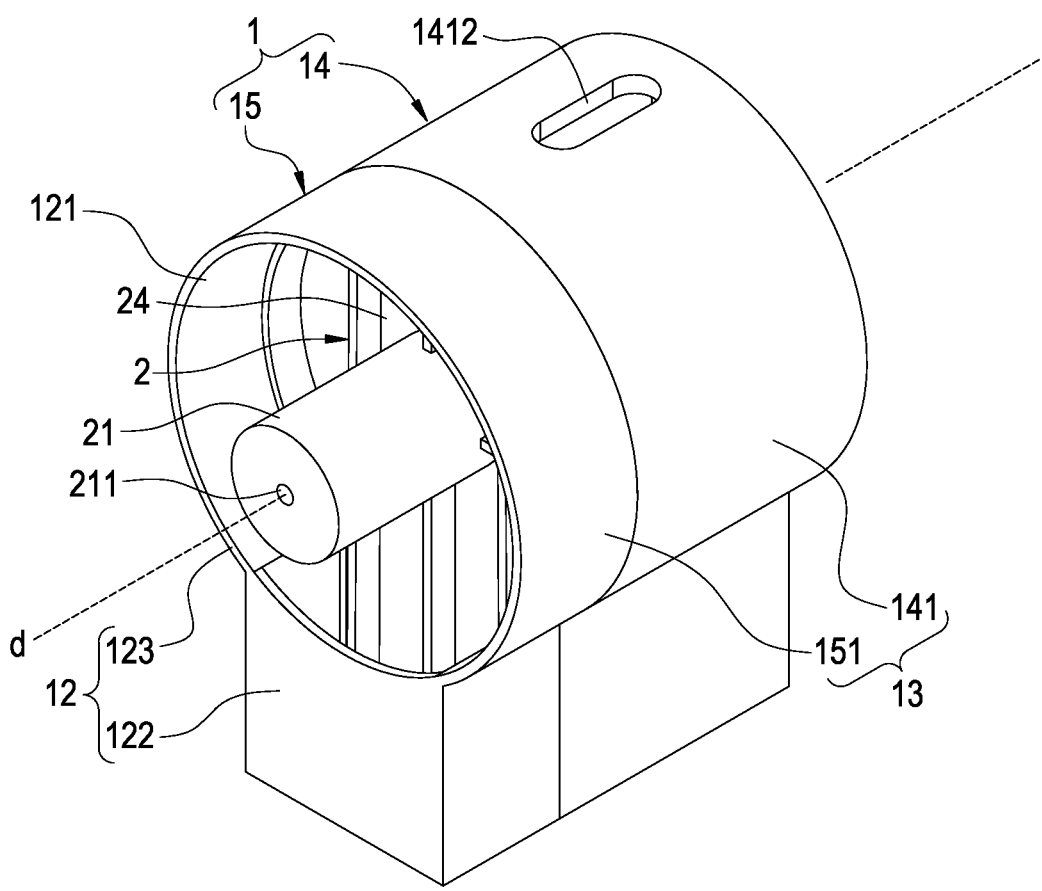
FIG. 5 is a perspective view of the second embodiment of a joint structure of this disclosure.

With reference to FIGS. 4 and 5 for the second embodiment of a joint structure 10 of this disclosure, the second embodiment is substantially the same as the first embodiment except that the rotating member 2 is not limited to a motor.

Further, the rotating member 2 of this embodiment is a general pivot, and the rotating member 2 includes a positioning plate 24, and a rotating shaft 21 formed and extended from the positioning plate 24.

In addition, the rotating shaft 21 has a first through hole 211, and a plurality of second fixing holes 22 formed on the positioning plate 24, and each screw 3 is passed and fixed into each respective second fixing hole 22 and each respective first fixing hole 143, so that the positioning plate 24 is fixed in the first casing 14.

Figure 6:
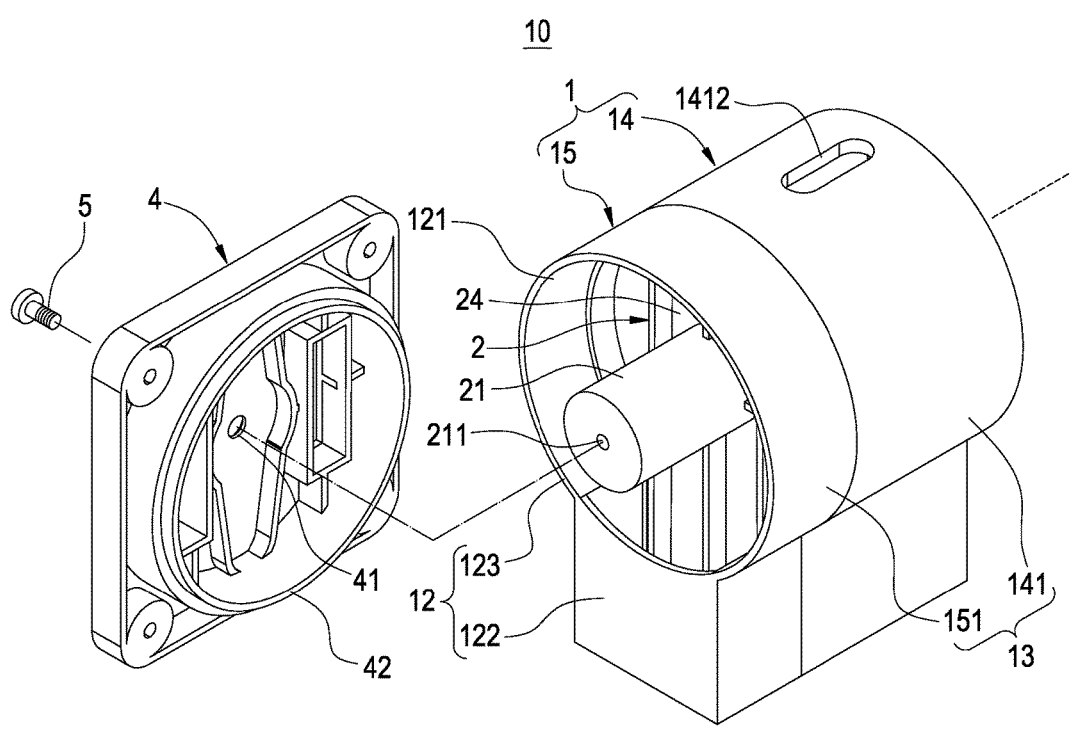
FIG. 6 is an exploded view of a third embodiment of a joint structure of this disclosure.
Figure 7:
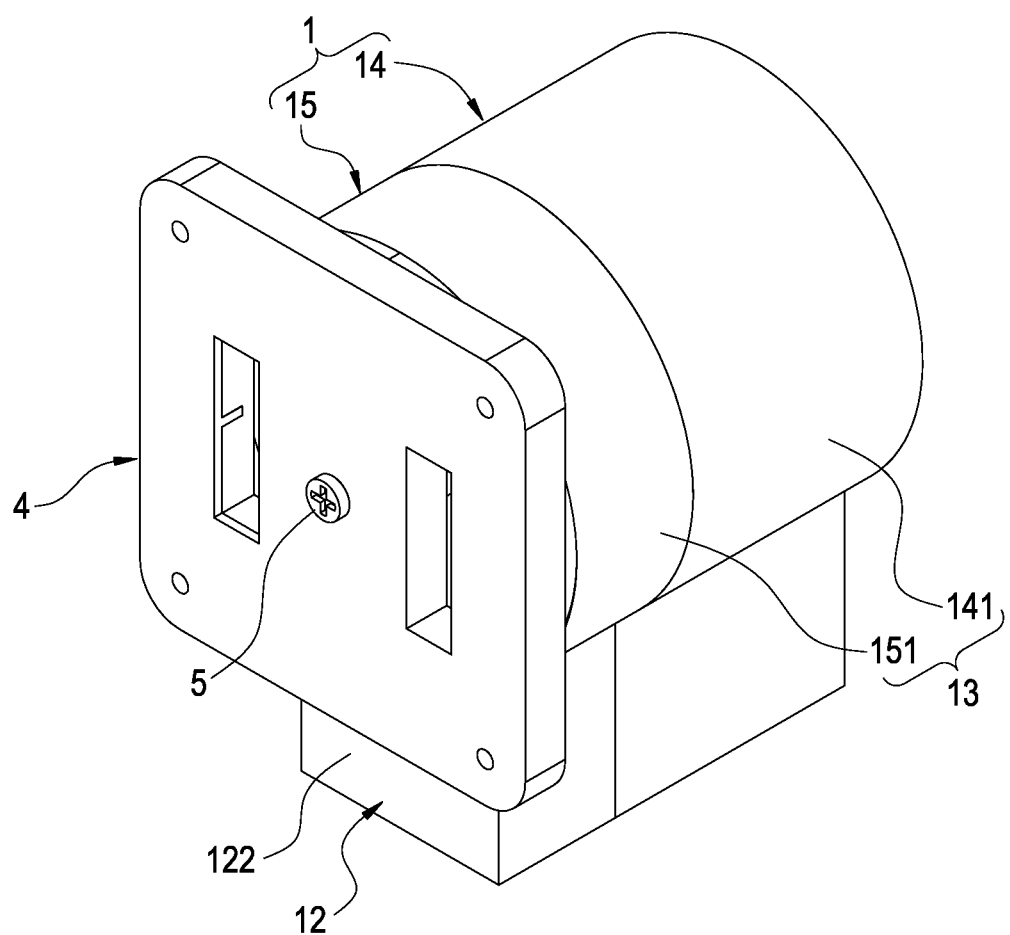
FIG. 7 is a perspective view of the third embodiment of a joint structure of this disclosure.
Figure 8:
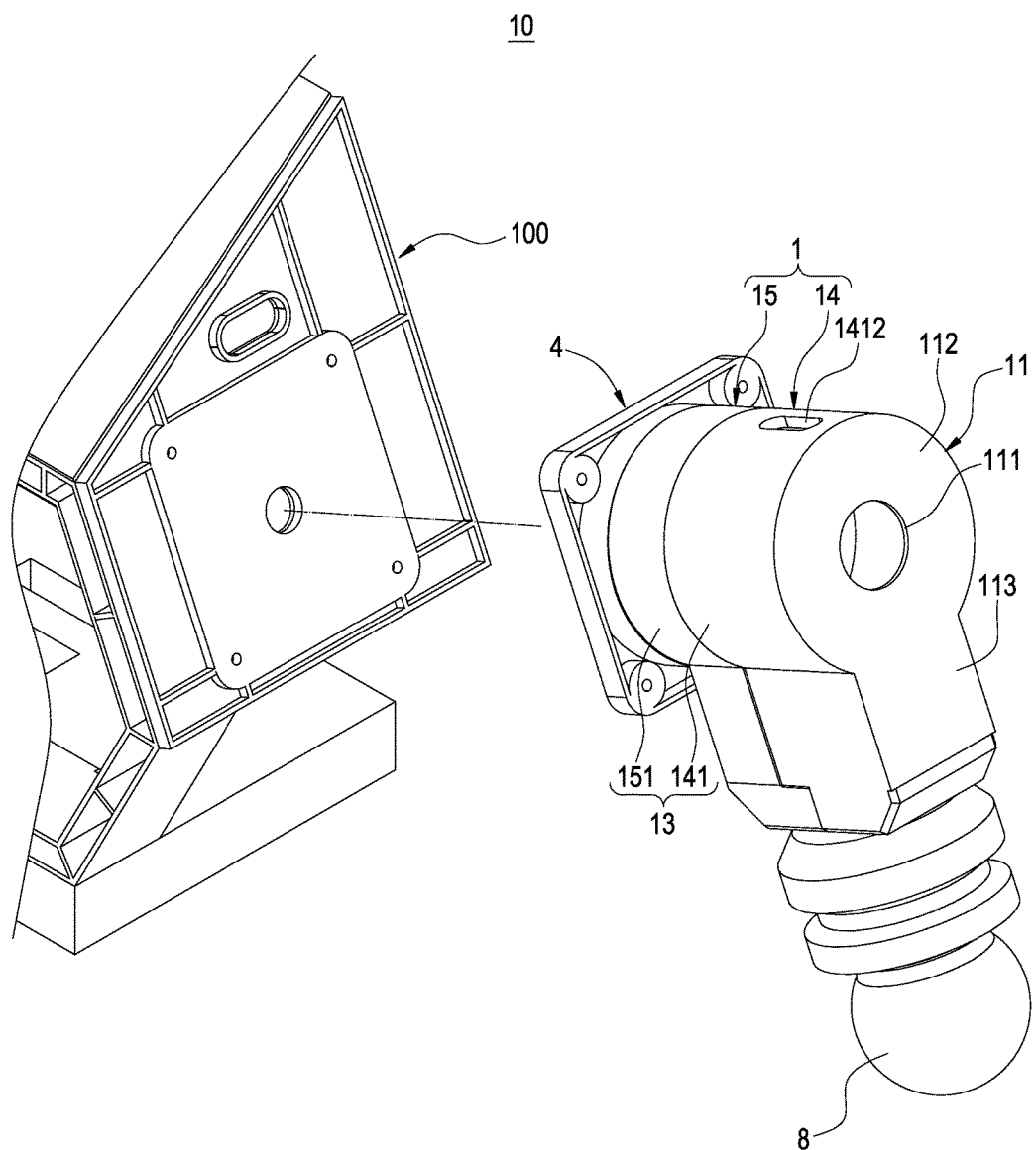
FIG. 8 is a schematic view of a using status of the third embodiment of a joint structure of this disclosure.

With reference to FIGS. 6 to 8 for the third embodiment of a joint structure 10 of this disclosure, and the third embodiment is substantially the same as and the second embodiment, except that the joint structure 10 of this embodiment further comprises a connecting element 4 and a fixing element 5.

Wherein, the rotating member 2 of this embodiment is a general pivot, but the rotating member 2 of this disclosure may be a motor. Regardless of the rotating member 2 being a general pivot or a motor, the rotating shaft 21 has a first through hole 211.

Specifically, the connecting element 4 has a second through hole 41 and an annular plate 42 extended from the external periphery of the second through hole 41, and the fixing element 5 is passed through the first through hole 211 and the second through hole 41 and fixed to the first through hole 211, and the annular plate 42 is passed into the penetrating hole 121 and rotatable with respect to the penetrating hole 121, such that when the connecting element 4 is fixed to a robot skeleton 100, the joint hollow body 1 is rotatable with respect to the connecting element 4 through the rotating shaft 21. In other words, the joint hollow body 1 is rotatable with respect to the robot skeleton 100 through the rotating shaft 21.

Figure 9:
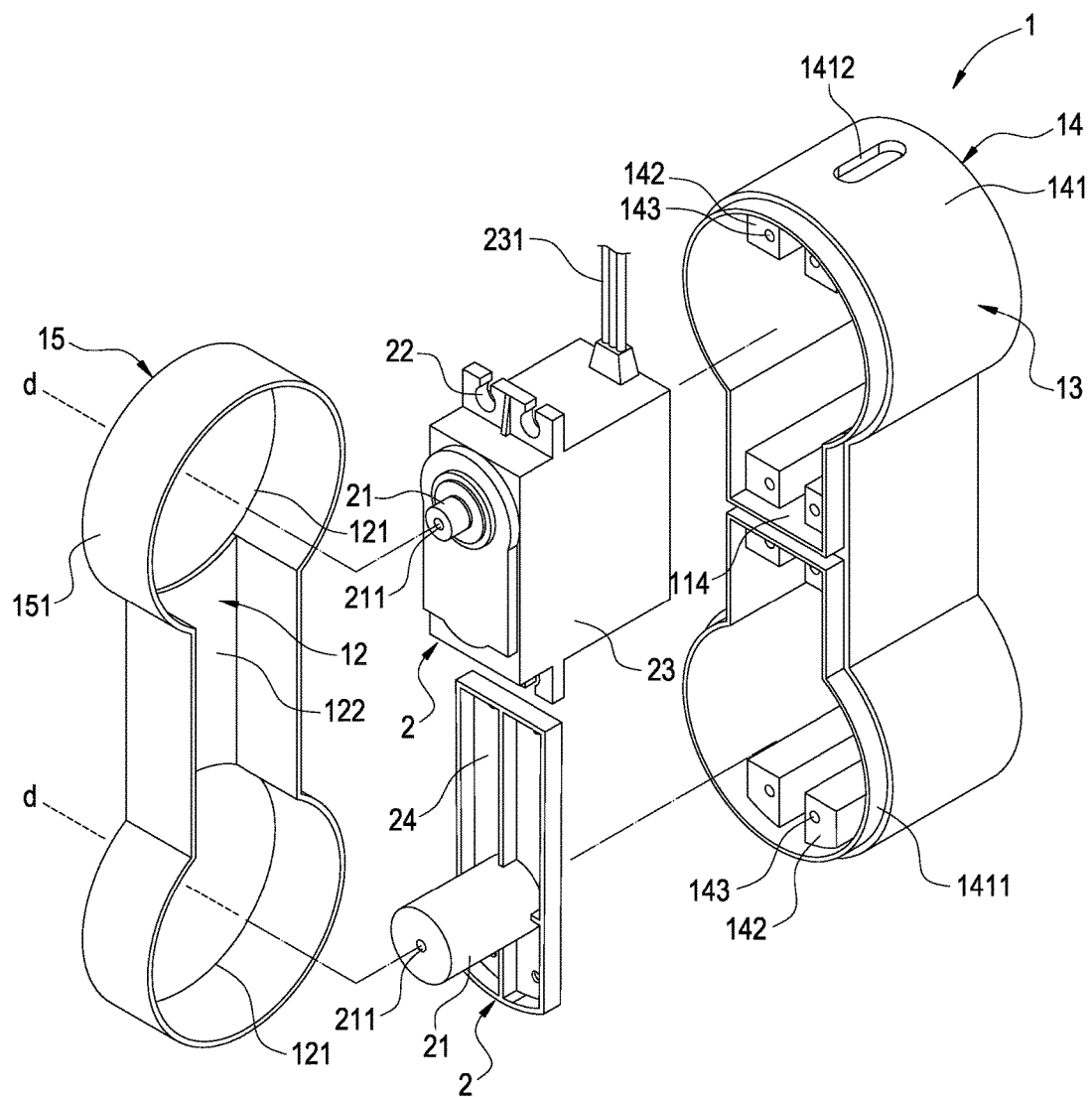
FIG. 9 is an exploded view of a fourth embodiment of a joint structure of this disclosure.
Figure 10:
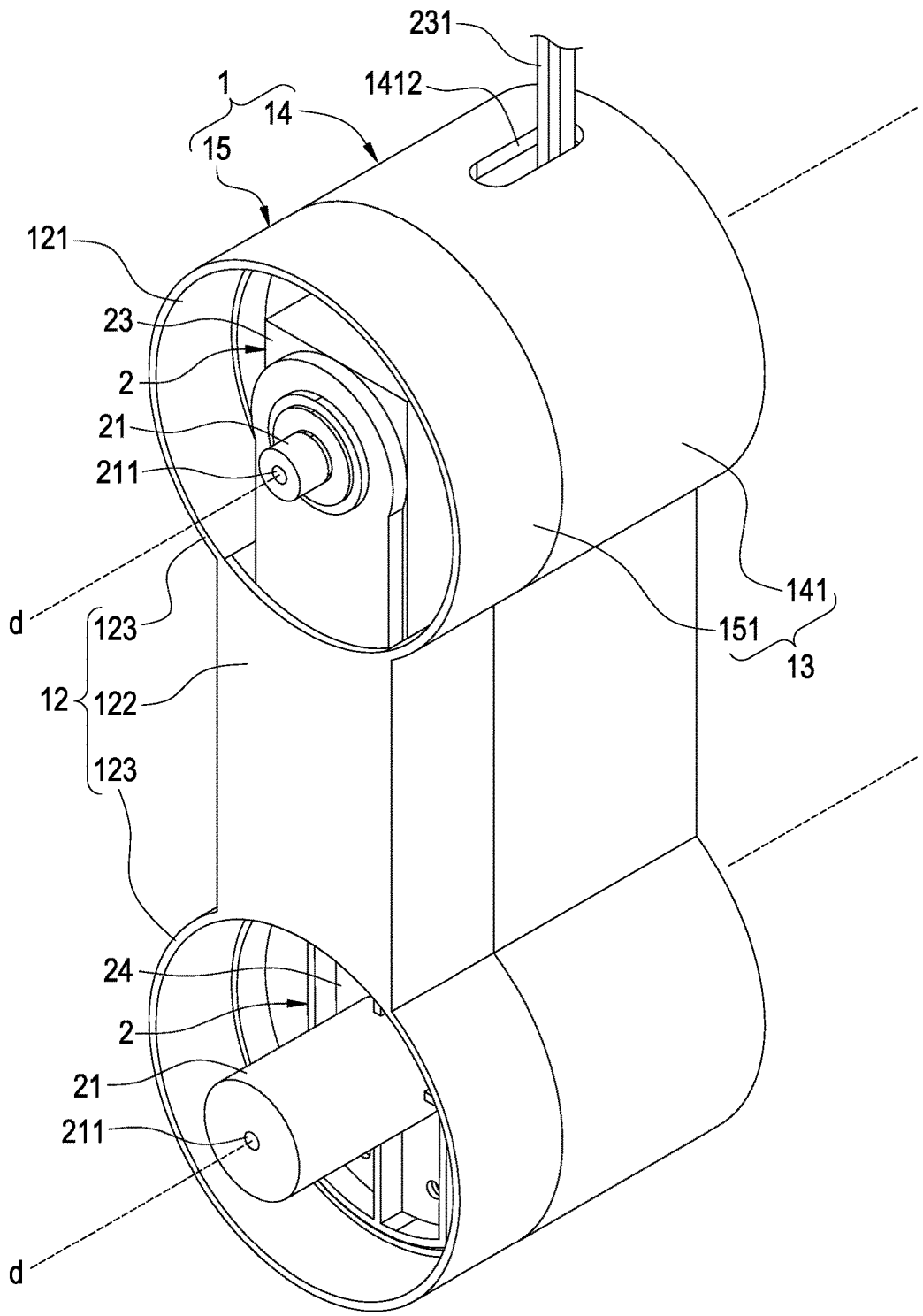
FIG. 10 is a perspective view of the fourth embodiment of a joint structure of this disclosure.

With reference to FIGS. 9 and 10 for the fourth embodiment of a joint structure 10 of this disclosure, the fourth embodiment is substantially the same as the first embodiment except that there are two penetrating holes 121 in the fourth embodiment.

Further, the first plate 11 includes a first rectangular plate 112 and first circular plate 113 extended from both ends of the first rectangular plate 112 respectively, and the second plate 12 includes a second rectangular plate 122 and two second circular plates 123 extended from both ends of the second rectangular plate 122 respectively, and the first plate 11 includes two air holes 111 configured to be opposite to the two penetrating holes 121 respectively, and each air hole 111 is formed on each respective first circular plate 113, and each penetrating hole 121 is formed on each respective second circular plate 123.

In addition, a partition plate 114 is protruded from the middle of the first rectangular plate 112, and a plurality of fixing columns 142 is jointly extended from the first plate 11 and at least one of the first external side plate 141 and the partition plate 114, and each fixing column 142 has a first fixing hole 143.

In addition, there are two rotating members 2, and each rotating member 2 has a plurality of second fixing holes 22, and each screw 3 is passed and fixed into each respective second fixing hole 22 and each respective first fixing hole 143, so that one joint hollow body 1 is fixed to two rotating members 2. Therefore, one joint hollow body 1 can be used for fixing two rotating members 2 to improve the convenience and widespread use of the joint structure 10.

Figure 11:
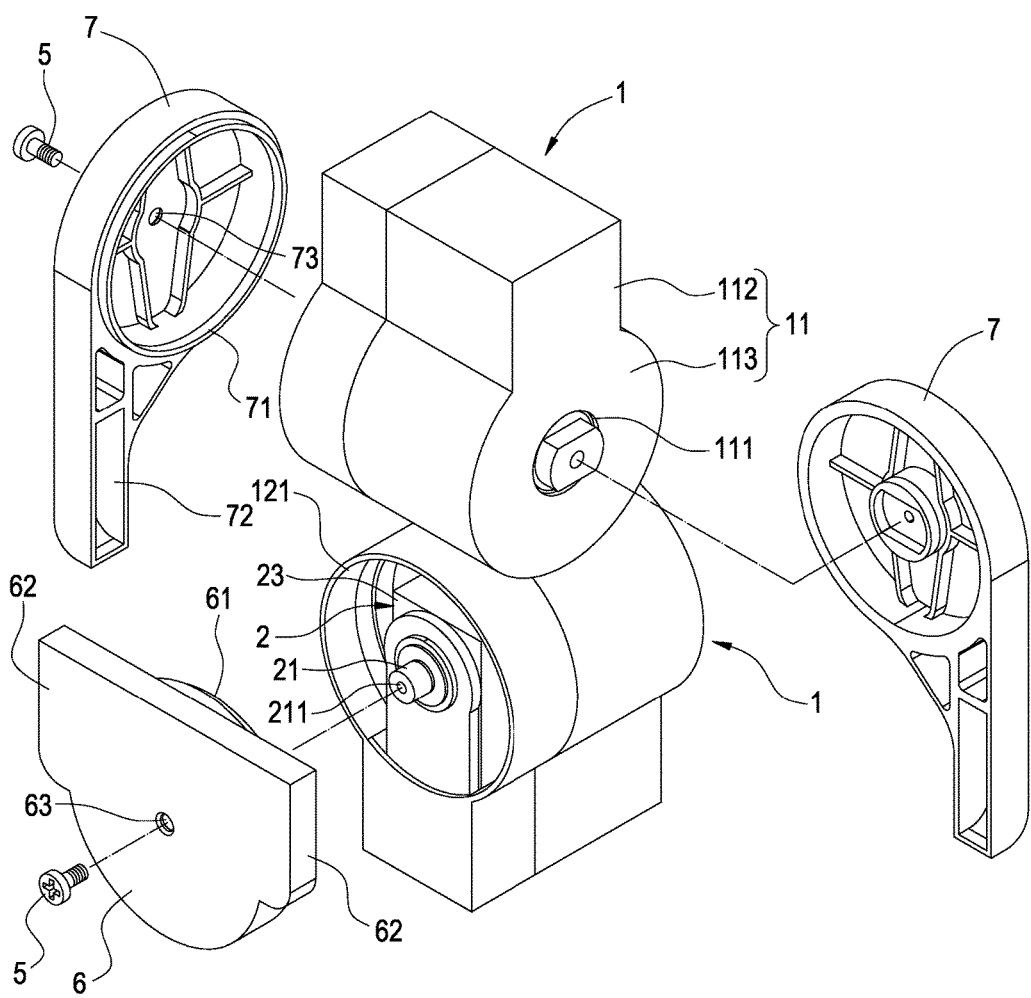
FIG. 11 is an exploded view of a fifth embodiment of a joint structure of this disclosure.

With reference to FIG. 11 for the fifth embodiment of a joint structure 10 of this disclosure, the fifth embodiment is substantially the same as the first embodiment except that the joint structure 10 of the fifth embodiment further comprises two fixing elements 5, a first assembled member 6 and a second assembled member 7.

Specifically, a first ring plate 61, a bump 62 and a third through hole 63 are extended and formed from the first assembled member 6, and one of the fixing elements 5 is passed through the third through hole 63 and the first through hole 211 and fixed into the first through hole 211, and the first ring plate 61 is passed and connected to the penetrating hole 121 and rotatable with respect to the penetrating hole 121, and the second assembled member 7 includes a second ring plate 71, a groove 72 and a fourth through hole 73 thereon, and another fixing element 5 is passed through the fourth through hole 73 and the first through hole 211 and fixed to the first through hole 211, and the second ring plate 71 is passed and connected to the penetrating hole 121 and rotatable with respect to the penetrating hole 121, and the bump 62 is embeddable into the groove 72. Therefore, the two joint structures 10 may be assembled and rotated with respect to each other through the first assembled member 6 and the second assembled member 7, and the two joint structures 10 may be move two-dimensionally through the first assembled member 6 and the second assembled member 7.

In FIG. 11, the rotating member 2 installed in the joint hollow body 1 may be protruded out from the air hole 111 under the effect of the air hole 111 of the first plate 11, so that the rotating member 2 protruded out from the air hole 111 may be connected or fixed to another component (including but not limited to the first assembled member 6 or the second assembled member 7).

Figure 12:
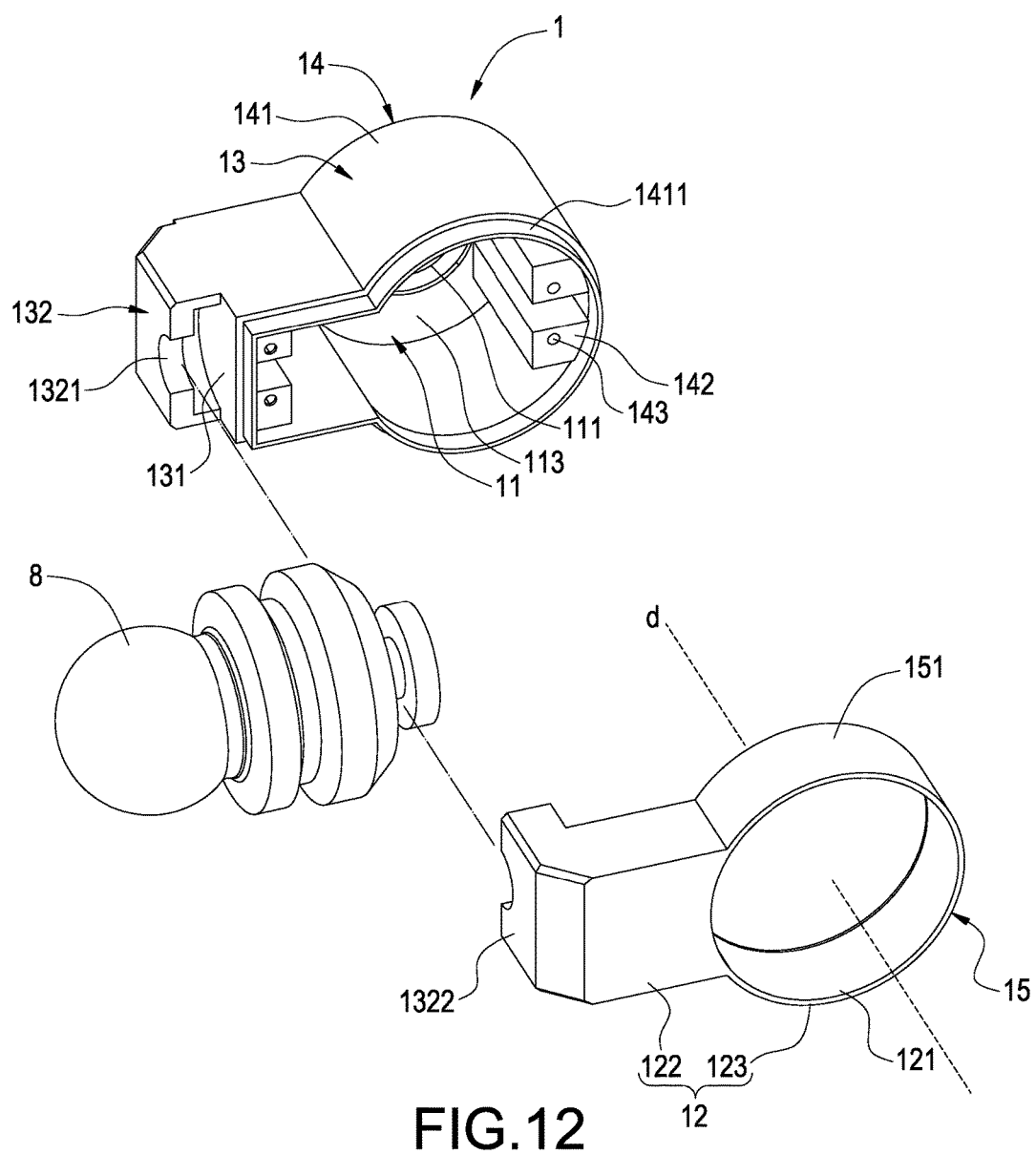
FIG. 12 is an exploded view of a sixth embodiment of a joint structure of this disclosure.
Figure 13:
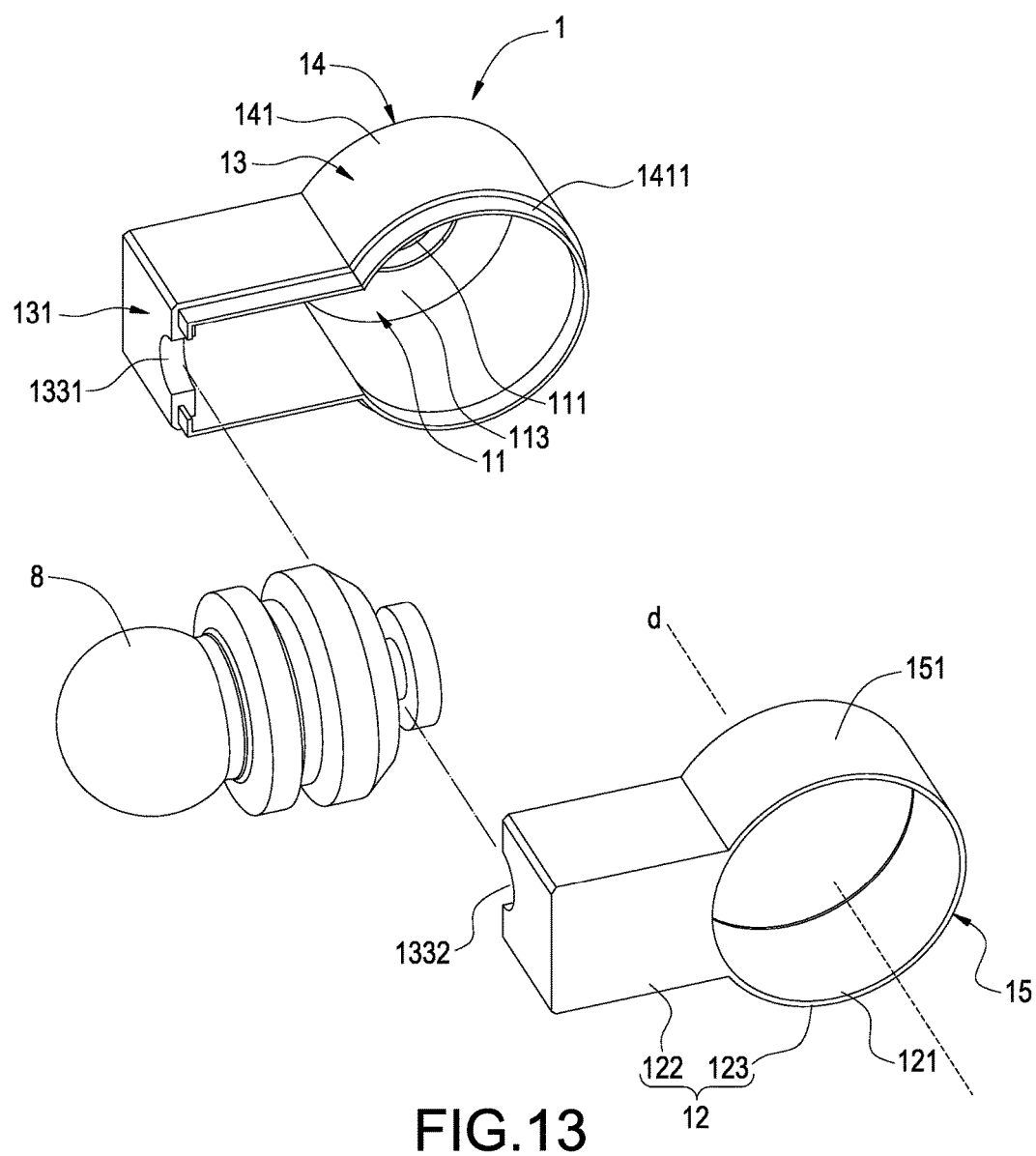
FIG. 13 is an exploded view of a seventh embodiment of a joint structure of this disclosure.

With reference to FIG. 12 for the sixth embodiment of a joint structure 10 of this disclosure, the sixth embodiment is substantially the same as the first embodiment except that the joint structure 10 of the sixth embodiment has a receiving portion 131 disposed at the bottom of the external side plate 13, and a latch block 132 extended from the receiving portion 131.

Further, the joint structure 10 of this disclosure further comprises a third assembled member 8, a receiving portion 131 disposed at the bottom of the external side plate 13, and a latch block 132 extended from the receiving portion 131, and the latch block 132 includes a first latch block 1321 extended from the bottom of the first external side plate 141 and a second latch block 1322 extended from the bottom of the second external side plate 151, and the first latch block 1321 and the second latch block 1322 are jointly clamped and latched with the third assembled member 8. Therefore, the receiving portion 131 may be connected externally to the third assembled member 8 or any other component.

With reference to FIG. 12 for the seventh embodiment of a joint structure 10 of this disclosure, the seventh embodiment is substantially the same as the first embodiment except that the seventh embodiment has a receiving portion 131 disposed at the bottom of the external side plate 13 and a latch groove 133 formed on the receiving portion 131.

Specifically, the joint structure 10 of this disclosure further comprises a third assembled member 8, a receiving portion 131 disposed at the bottom of the external side plate 13, and a latch groove 133 formed on the receiving portion 131, and the latch groove 133 includes a first notched groove 1331 formed at a lower edge of the first external side plate 141 and a second notched groove 1332 formed at a lower edge of the second external side plate 151, and the receiving portion 131 is latched and connected to the third assembled member 8 through the first notched groove 1331 and the second notched groove 1332. Therefore, the receiving portion 131 can be connected externally to the third assembled member 8 or other components.

Figure 14:
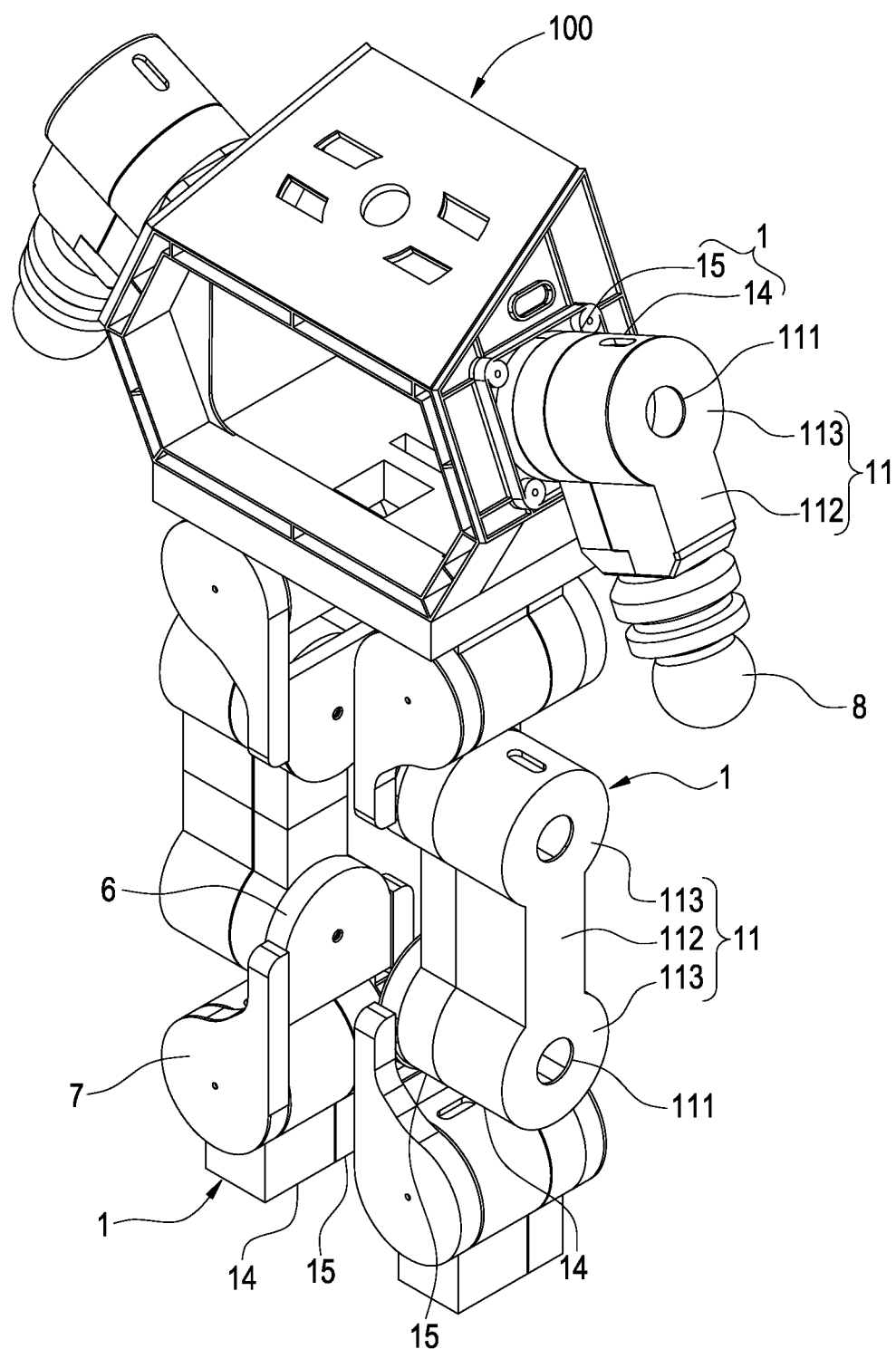
FIG. 14 is a schematic view of a using status of the first to seventh embodiments of a joint structure of this disclosure.
Figure 15:
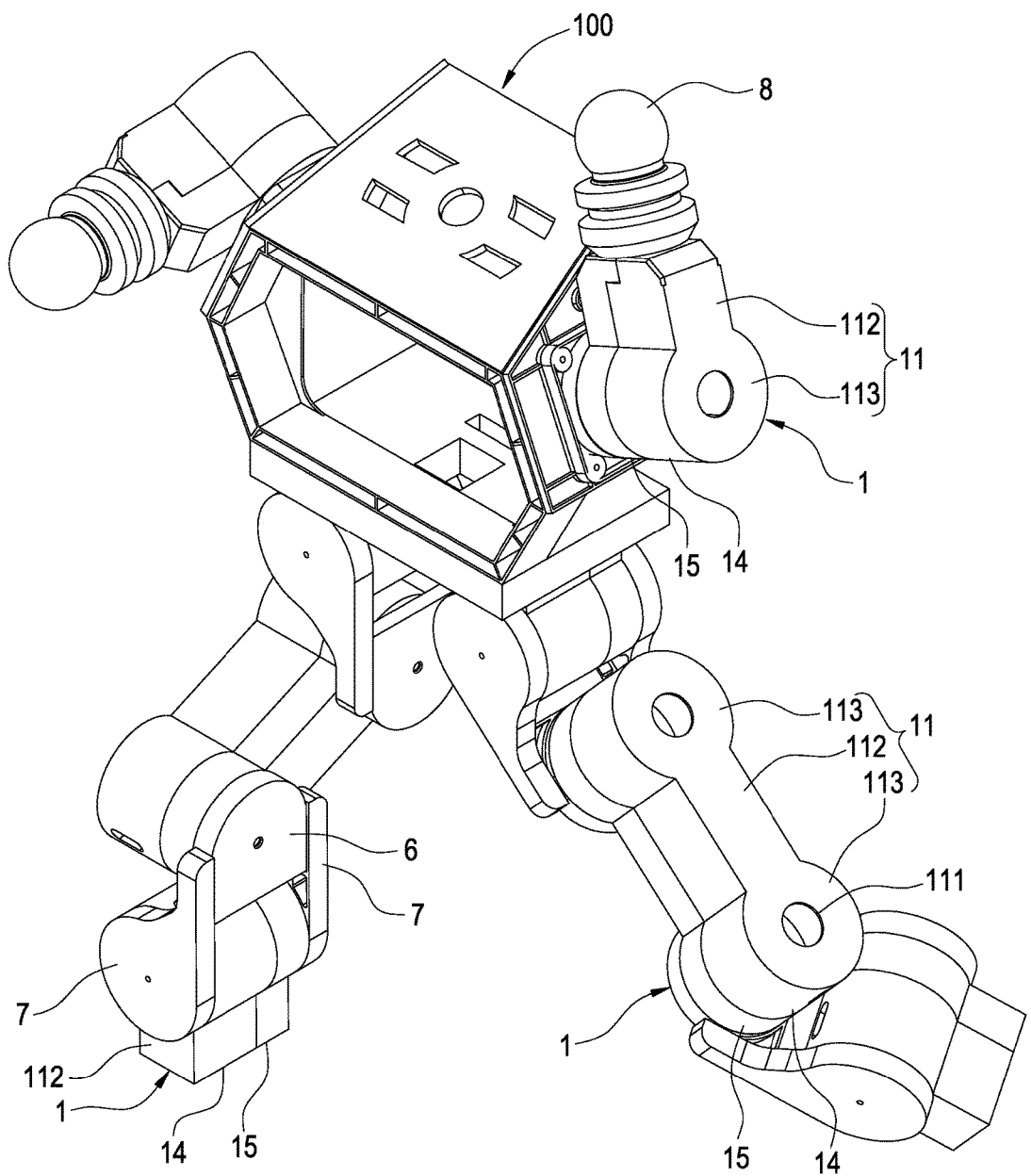
FIG. 15 is a schematic view of another using status of the first to seventh embodiments of a joint structure of this disclosure.

With reference to FIGS. 14 and 15 for the schematic views of the first to seventh embodiments of a joint structure 10 of this disclosure, the components and structures of the first to seventh embodiments of this disclosure are assembled with a robot skeleton 100 to form a robot, and the robot can rotate with respect to the robot skeleton 100 through the joint structure 10, so that the robot may walk or crawl.

Figure 16:
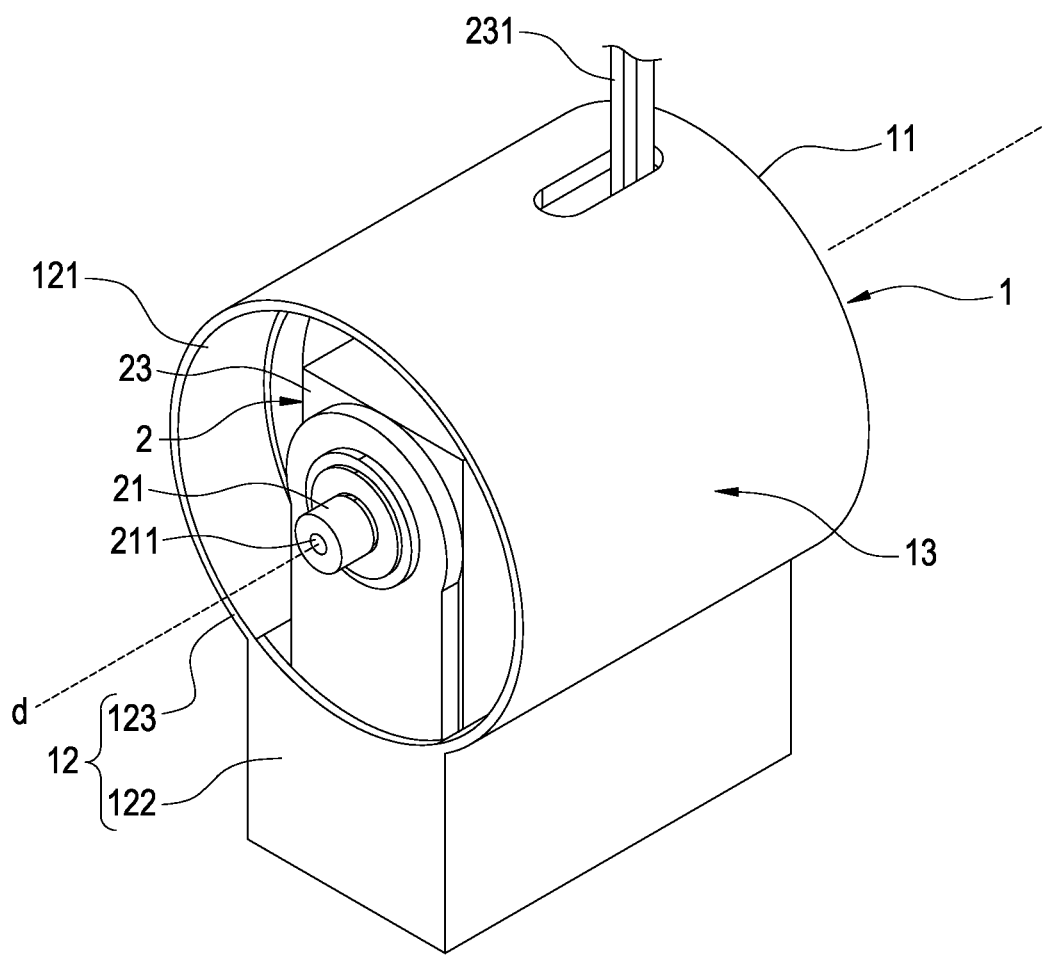
FIG. 16 is an exploded view of an eighth embodiment of a joint structure of this disclosure.

With reference to FIG. 16 for the eighth embodiment of a joint structure 10 of this disclosure, the eighth embodiment is substantially the same as the first embodiment except that the first plate 11, the second plate 12 and the external side plate 13 are integrally formed with one another.

Further, the joint hollow body 1 of the eighth embodiment is constructed by integrally combining the first plate 11, the second plate 12 and the external side plate 13 with one another, which is obviously different from the joint hollow body 1 of the first embodiment having a first casing 14 and a second casing 15 engaged with each other as shown in FIG. 1. Therefore, the formation method of the first plate 11, the second plate 12 and the external side plate 13 may be the method as described in the first embodiment or the method as described in the eighth embodiment.

Regardless of the aforementioned formation methods of the first plate 11, the second plate 12 and the external side plate 13, both ends of the external side plate 13 are integrally formed with the external periphery of the first plate 11 and the external periphery of the second plate 12 to enhance the structural strength of the joint hollow body 10, so that the joint hollow body 10 has the advantages of non-concentrated stress and high cracking resistance.

Figure 17:
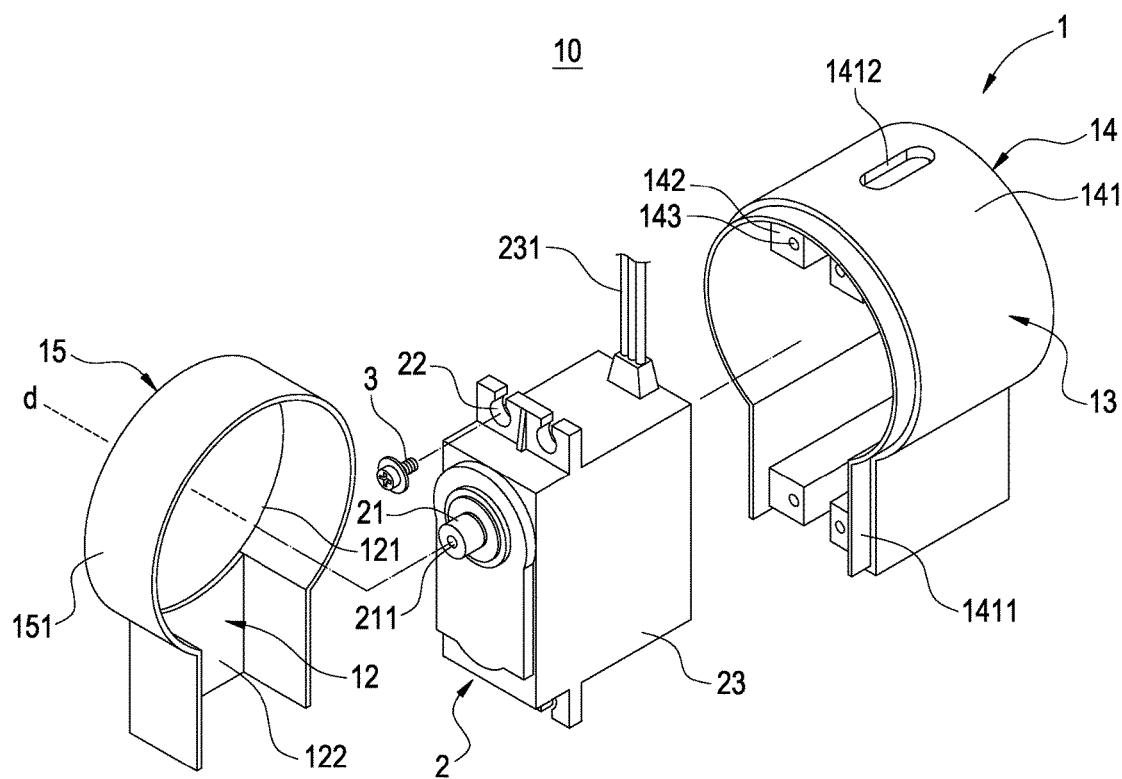
FIG. 17 is an exploded view of a ninth embodiment of a joint structure of this disclosure.

With reference to FIG. 17 for the ninth embodiment of a joint structure 10 of this disclosure, the ninth embodiment is substantially the same as the first embodiment except that the external side plate 13 of the ninth embodiment is a semi-circular plate.

Specifically, the external side plate 13 as shown in FIG. 1 may be a circular plate to form a closed circular plate, or the external side plate 13 as shown in FIG. 17 may also be a semi-circular plate to form an unclosed circular plate.

In FIG. 17, the external side plate 13 is the unclosed circular plate, and a plurality of fixing columns 142 is jointly extended from the first plate 11 and the first external side plate 141, and each fixing column 142 has a first fixing hole 143, and the rotating member 2 has a plurality of second fixing holes 22, and each screw 3 is passed and fixed to the second fixing hole 22 and each respective first fixing hole 143, so that the rotating member 2 is fixed in the first casing 14.

Wherein, the two fixing columns 142 are disposed at both ends of the first external side plate 141 respectively, such that when the rotating member 2 is fixed to the fixing column 142, both ends of the first external side plate 141 are limited by the rotating member 2 to prevent both ends of the first external side plate 141 from expanding outward or retracting inward by an external force, so as to achieve the effect of enhancing the structural strength of the first external side plate 141 by the fixing column 142.

In summation of the description above, the joint structure of this disclosure has the external side plate 13 extended in the axial direction d from the external periphery of the first plate 11 and the second plate 12, and the external side plate 13 includes a first side plate 141 and a second side plate 151 which may be integrated or separated with each other, so as to overcome the issue of insufficient structural strength of the joint structure produced by 3D printing, and the rotating member 2 is fixed and the external side plate 13 is limited, so that the external side plate 13 is not limited to the form of a closed circular plate anymore.

While this disclosure has been described by means of specific embodiments, numerous modifications and variations could be made thereto by those skilled in the art without departing from the scope and spirit of this disclosure set forth in the claims.

What is claimed is:

1. A joint structure, comprising:
a joint hollow body, having a first plate and a second plate arranged opposite to each other, and the second plate having a penetrating hole and defining an axial direction with respect to the penetrating hole, wherein an external side plate is extended in the axial direction from an external periphery of the first plate and connected to an external periphery of the second plate, the joint hollow body further comprising a first and second casing engaged with each other, the first casing including the first plate and a first external side plate extending from the external periphery of the first plate, and the second casing includes the second plate and a second external side plate extended from the external periphery of the second plate, wherein a plurality of fixing columns jointly extend from the first plate and the first external side plate, each of the fixing columns having a first fixing hole; and
a rotating member fixed within the joint hollow body, the rotating member having a plurality of second fixing holes configured to be aligned with the first fixing holes.

2. The joint structure as claimed in claim 1, wherein the rotating member comprises a rotating shaft that is exposed and protruded out from the penetrating hole.

3. The joint structure as claimed in claim 2, wherein the second casing is correspondingly covered onto the first casing, and the second external side plate and the first external side plate are connected with each other to form the external side plate.

4. The joint structure as claimed in claim 3, further comprising a plurality of screws, wherein the screws are passed through and fixed into the second fixing holes and the first fixing holes respectively.

5. The joint structure as claimed in claim 3, wherein the first external side plate includes a protruding member extended therefrom, and the second external side plate is installed to the protruding member and latched with the protruding member.

6. The joint structure as claimed in claim 3, wherein the first plate has an air hole configured to be opposite to the penetrating hole.

7. The joint structure as claimed in claim 6, wherein the first plate includes a first rectangular plate and a first circular plate extended from the top of the first rectangular plate, and the second plate includes a second rectangular plate and a second circular plate extended from the top of the second rectangular plate, and the air hole is formed on the first circular plate, and the penetrating hole is formed on the second circular plate.

8. The joint structure as claimed in claim 3, wherein penetrating hole comes with a quantity of two, and the first plate has two air holes configured to be opposite to the two penetrating holes respectively.

9. The joint structure as claimed in claim 8, wherein the first plate includes a first rectangular plate and two first circular plates extended from both ends of the first rectangular plate respectively, and the second plate includes a second rectangular plate and two second circular plate extended from both ends of the second rectangular plate, and each air hole is formed on each respective first circular plate, and each penetrating hole is formed on each respective second circular plate.

10. The joint structure as claimed in claim 9, further comprising a plurality of screws, a partition plate protruded from the middle of the first rectangular plate, and a plurality of fixing columns jointly extended from the first plate and at least one of the first external side plate and the partition plate, and each fixing column having a first fixing hole, and the rotating member coming with a quantity of two, and each rotating member having a plurality of second fixing holes, and the screws being passed and fixed into the second fixing holes and the first fixing holes respectively.

11. The joint structure as claimed in claim 3, wherein the rotating member is a motor, and the motor includes an electric wire, and the first external side plate has a wire passing hole for passing the electric wire.

12. The joint structure as claimed in claim 11, further comprising a connecting element and a fixing element, and the rotating shaft having a first through hole, and the connecting element having a second through hole and an annular plate extended from the external periphery of the second through hole, and the fixing element being passed through the first through hole and the second through hole and fixed into the first through hole, and the annular plate being passed into the penetrating hole and rotatable with respect to the penetrating hole.

13. The joint structure as claimed in claim 3, wherein the rotating member includes a positioning plate, and the rotating shaft is formed and upwardly extended from the positioning plate.

14. The joint structure as claimed in claim 13, further comprising a connecting element and a fixing element, and the rotating shaft having a first through hole, and the connecting element having a second through hole and an annular plate extended from the external periphery of the second through hole, and the fixing element being passed through the first through hole and the second through hole and fixed into the first through hole, and the annular plate being passed through the penetrating hole and rotatable with respect to the penetrating hole.

15. The joint structure as claimed in claim 3, further comprising a first assembled member and a second assembled member, and the first assembled member having a first ring plate and a bump extended therefrom, and the first ring plate being passed and connected to the penetrating hole and rotatable with respect to the penetrating hole, and the second assembled member having a second ring plate and a groove, and the second ring plate being passed and connected to the penetrating hole and rotatable with respect to the penetrating hole, and the bump being embeddable into the groove.

16. The joint structure as claimed in claim 15, further comprising two fixing elements, and the rotating shaft having a first through hole, and the first assembled member having a third through hole, and the second assembled member having a fourth through hole, and one of the fixing elements being passed through the third through hole and the first through hole and fixed into the first through hole, and the other one of the fixing elements being passed through the fourth through hole and the first through hole and fixed into the first through hole.

17. The joint structure as claimed in claim 3, further comprising a third assembled member, a receiving portion disposed at the bottom of the external side plate, and a latch block extended from the receiving portion, and the third assembled member being latched and connected to the latch block.

18. The joint structure as claimed in claim 3, further comprising a third assembled member, a receiving portion disposed at the bottom of the external side plate, and a latch groove formed on the receiving portion, and the third assembled member being latched and connected to the latch groove.

19. The joint structure as claimed in claim 3, further comprising a third assembled member, a receiving portion disposed at the bottom of the external side plate, and a latch block extended from the receiving portion, and the latch block including a first latch block extended from the bottom of the first external side plate and a second latch block extended from the bottom of the second external side plate, and the first latch block and the second latch block clamping each other and being latched and connected to the third assembled member.

20. The joint structure as claimed in claim 3, further comprising a third assembled member, a receiving portion disposed at the bottom of the external side plate, and a latch groove formed on the receiving portion, and the latch groove including a first notched groove formed at a lower edge of the first external side plate and a second notched groove formed at a lower edge of the second external side plate, and the receiving portion being latched and connected to the third assembled member through the first notched groove and the second notched groove.

21. The joint structure as claimed in claim 1, wherein the joint hollow body is manufactured by a 3D printing technology.

22. The joint structure as claimed in claim 1, wherein the first plate, the second plate and the external side plate are integrally formed.

23. The joint structure as claimed in claim 1, wherein the external side plate is a closed circular plate.

24. The joint structure as claimed in claim 1, wherein the external side plate is an unclosed circular plate.

* * * * *